United States Patent
Ketharaju et al.

(10) Patent No.: US 12,229,153 B2
(45) Date of Patent: Feb. 18, 2025

(54) QUERY-BASED BINARIZED POINT DECISIONS

(71) Applicant: Wells Fargo Bank, N.A., San Francisco, CA (US)

(72) Inventors: Rameshchandra Bhaskar Ketharaju, Hyderabad (IN); Naveen Gururaja Yeri, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 18 days.

(21) Appl. No.: 18/300,767

(22) Filed: Apr. 14, 2023

(65) Prior Publication Data
US 2024/0346030 A1 Oct. 17, 2024

(51) Int. Cl.
*G06F 16/20* (2019.01)
*G06F 16/2455* (2019.01)
*G06F 16/2457* (2019.01)

(52) U.S. Cl.
CPC .. *G06F 16/24578* (2019.01); *G06F 16/24564* (2019.01)

(58) Field of Classification Search
None
See application file for complete search history.

(56) References Cited

U.S. PATENT DOCUMENTS

| | | | |
|---|---|---|---|
| 8,688,702 B1 | 4/2014 | Chapman | |
| 12,008,005 B2 * | 6/2024 | Kondiles | G06F 16/24553 |
| 2002/0111890 A1 | 8/2002 | Sloan et al. | |
| 2008/0249793 A1 | 10/2008 | Angell et al. | |
| 2014/0351233 A1 | 11/2014 | Crupi et al. | |
| 2018/0277246 A1 * | 9/2018 | Zhong | G06F 16/3329 |
| 2019/0220461 A1 | 7/2019 | Chavan et al. | |
| 2022/0197951 A1 * | 6/2022 | Stober | G06F 16/904 |
| 2022/0284307 A1 * | 9/2022 | McQueary, III | G06F 16/9024 |

* cited by examiner

*Primary Examiner* — Jau Shya Meng
(74) *Attorney, Agent, or Firm* — K&L Gates LLP

(57) ABSTRACT

Embodiments are generally directed to techniques for query-based binarized point decisions, such as with a system that can provide end-to-end decision making support. Some embodiments are particularly directed to a system that makes point decisions, with traceable reasoning, for queries while factoring in a variety of influences. In many embodiments, the traceable reasoning may refer to the generation and collection of metadata associated with various aspects of the decision making process. For example, the metadata may include, or be used to create, a decision lineage and/or reasoning summary that is generated for each point decision. Some embodiments may ensure various influences do not derail the query from the overall objective. In several such embodiments, the point decisioner may confirm or deny that a decision was made with aspect to a certain objective.

20 Claims, 13 Drawing Sheets

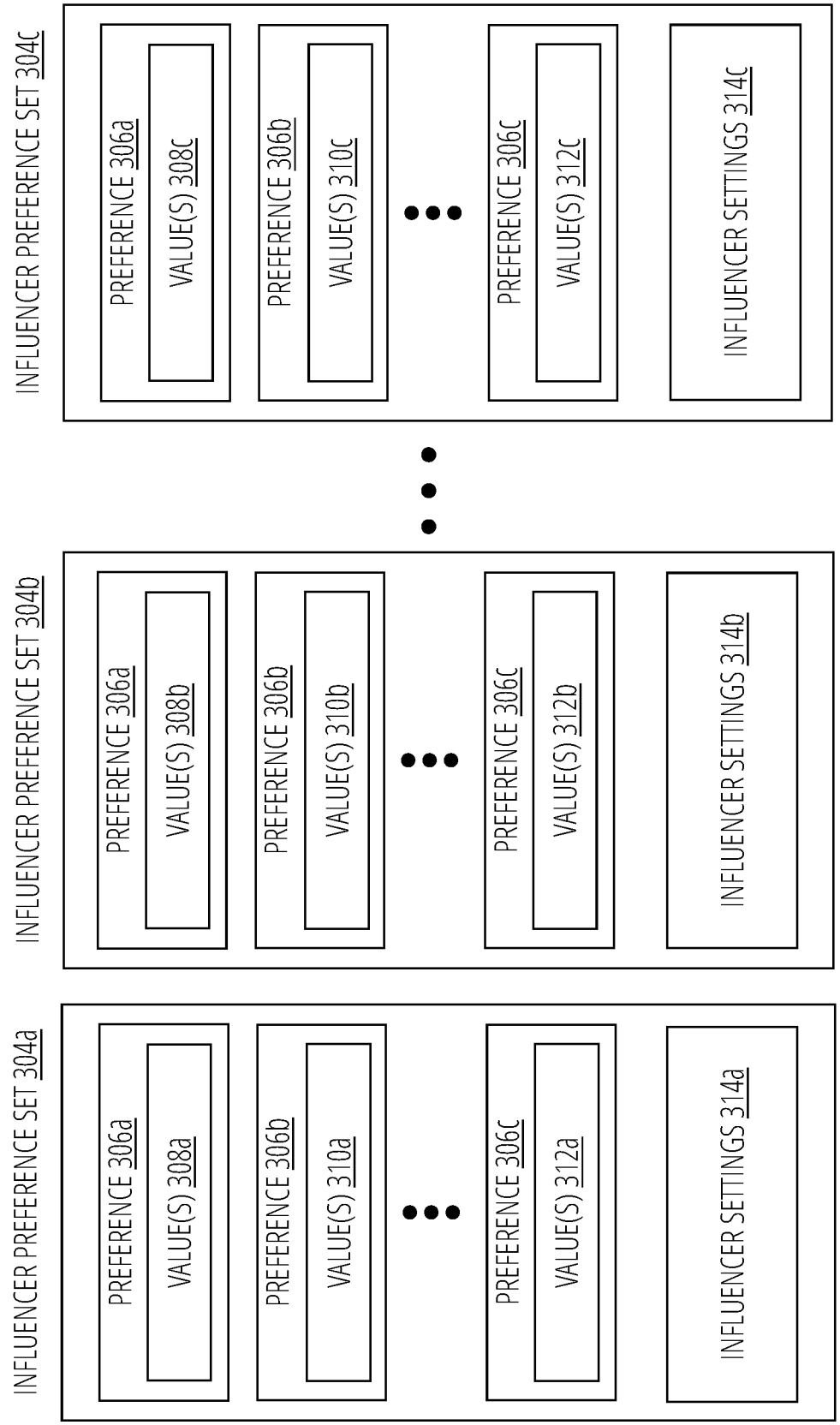

QUERY-BASED BINARIZED POINT DECISIONS

BACKGROUND

Decision making is a problem-solving activity yielding a solution deemed to be optimal or at least satisfactory. Decision-making problems usually involve the analysis of a finite set of alternatives described in terms of evaluative criteria to arrive at a solution. Typically, there does not exist a unique optimal solution for such problems and it is necessary to use decision-makers' preferences to differentiate between solutions. For example, in purchasing a car, cost, comfort, safety, and fuel economy may be some of the main criteria that are considered; however, it is unusual that the cheapest car is the most comfortable and the safest one. A solution to a decision-making problem may include ranking the alternatives in terms of how attractive they are to the decision-maker(s) when all the criteria are considered simultaneously, finding the best alternative, and/or determining the relative total priority of each alternative.

BRIEF SUMMARY

Processes, machines, and articles of manufacture for supporting query-based point decisions are described. It will be appreciated that the embodiments may be combined in any number of ways without departing from the scope of this disclosure.

Embodiments may include identifying a query; deconstructing the query into constant parameters and conditional parameters; generating a decision options set based, at least in part, on the constant parameters; identifying a set of two or more influencers associated with the query; determining a set of preferences and values for the preferences for each influencer; and generating a point decision for the query based on the sets of preferences and values for the preferences for each influencer, wherein the point decision comprises one decision option from the decision options set.

Other processes, machines, and articles of manufacture are also described hereby, which may be combined in any number of ways, such as with the embodiments of the brief summary, without departing from the scope of this disclosure.

BRIEF DESCRIPTION OF THE SEVERAL VIEWS OF THE DRAWINGS

The present disclosure is illustrated by way of example and not limitation in the figures of the accompanying drawings in which like references indicate similar elements. To easily identify the discussion of any particular element or act, the most significant digit or digits in a reference number refer to the figure number in which that element is first introduced.

FIG. 3B illustrates a block diagram of exemplary influencer preference sets according to one or more embodiments described herein.

DETAILED DESCRIPTION

Figure 1:
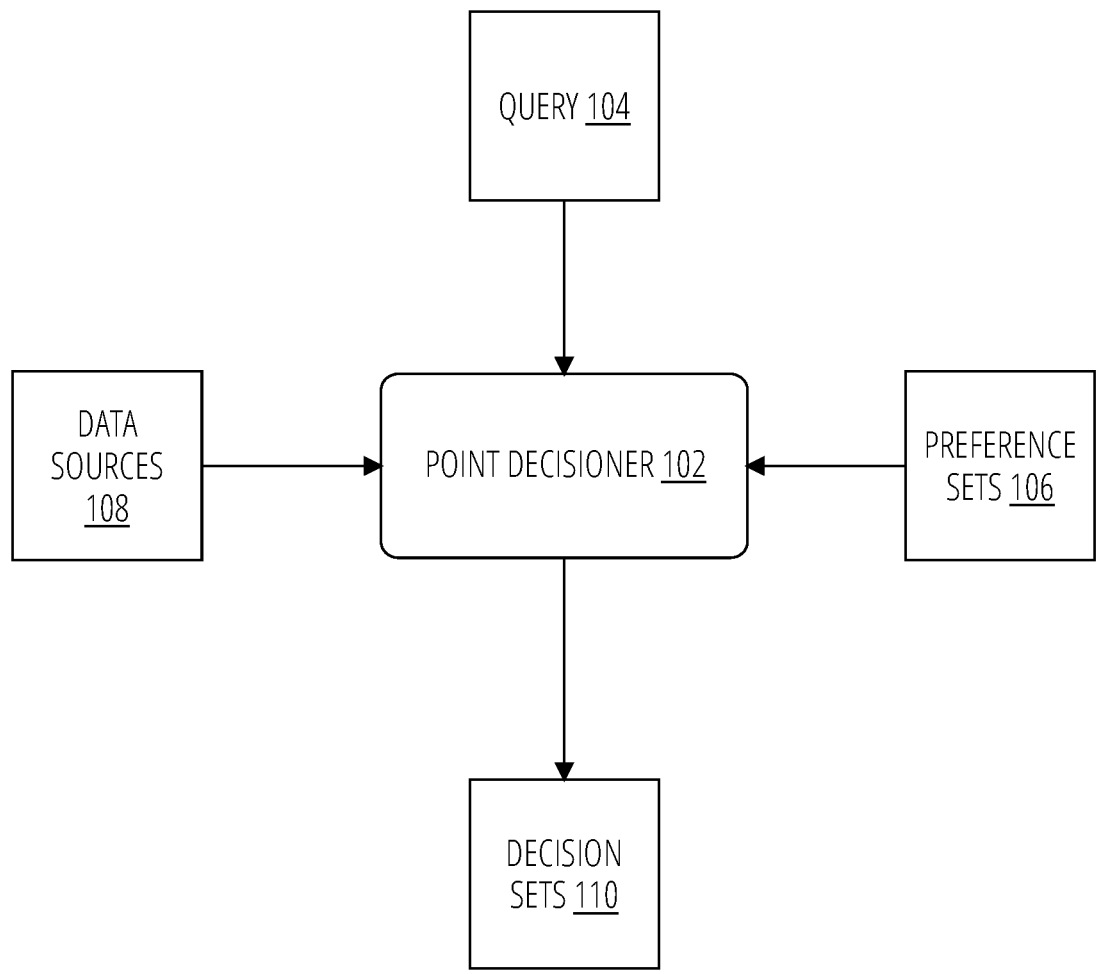
FIG. 1 illustrates an exemplary aspects of a point decisioner according to one or more embodiments described herein.

Various embodiments are generally directed to techniques for query-based binarized point decisions, such as with a system that can provide end-to-end decision making support. Some embodiments are particularly directed to a system that makes point decisions, with traceable reasoning, for queries while factoring in a variety of influences. In many embodiments, the traceable reasoning may refer to the generation and collection of metadata associated with various aspects of the decision making process. For example, the metadata may include, or be used to create, a decision lineage and/or reasoning summary that is generated for each point decision. Several embodiments may ensure various influences do not derail the query from the overall objective. In several such embodiments, the point decisioner may confirm or deny that a decision was made with aspect to a certain objective. These and other embodiments are described and claimed.

Many challenges face decision-making techniques, such as an inability to arrive at a point decision for a query. For example, existing systems may only make decisions that are conditional and are either a range-based predictor or open ended. In the real world, decision making is critical to business and personal endeavors. However, decision making is prone to risks associated with analytical/logical models that are deployed systematically or mentally. For example, systematic deployments use generic models that are not tuned for each specific query, resulting in poorly founded and/or misguided results. In another example, mental deployments are susceptible to personal biases, subconscious influences, and inconsistent application. Adding further complexity, existing techniques fail to provide end-to-end decision making support. For example, existing techniques fail to provide traceable reasoning to make supported decisions that track and memorialize aspects of decisions and the decision making process. Such limitations can drastically reduce the usability and applicability of decision-making systems, contributing to inefficient systems, devices, and techniques with limited capabilities.

Various embodiments described hereby include a point decisioner that provides end-to-end decision support. In various embodiments, the decisioner may provide end-to-end decision making support by determining and/or tracking one or more of objectives, influences, preferences, data sources, decision options, and outcomes associated with a query. In some embodiments, the point decisioner may identify decision options based on a query. In many embodiments, the point decisioner may determine a set of preferences associated with a query. In many such embodiments, the point decisioner may actively seek values for each preference in the set of preferences from each influencer. In various embodiments, the point decisioner may account for a variety of influences, criteria, objectives in arriving at one or more point decisions for a query. In some embodiments, the point decisioner may adapt the decision making process for each query, such as by generating customized conditional gates, filters, and/or machine learning models. In several embodiments, the point decisioner may provide traceable reasoning to support each decision in a transparent manner that adheres to query objectives and tracks the influences on, the processes used for, and the outcomes of each decision.

In these and other ways, components/techniques described hereby may be utilized to improve a variety of aspects of computerized decision making and decision making support, resulting in several technical effects and advantages over conventional computer technology, including increased capabilities and improved performance. For example, the point decisioner may enable computers to generate traceable reasoning to support point decisions using rules of a particular type that enhance and improve an existing technological process (e.g., by improving transparency in computerized decision making). Additional examples will be apparent from the detailed description below.

In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For example, the practical application may improve the technical process of computerized decision making by customizing the decision making process based on the query. In another example, the practical application may include an advancement in the process of computerized decision making, such as by identifying neutral and dynamic data and only processing dynamic manner to reduce processing burdens associated with computerized decision making. In yet another example, the practical application may include the generation of new data, such as by, generating decision lineages, extracting objectives from queries, and/or determining outcomes from decisions. Additional examples will be apparent from the detailed description below. Further, one or more of the aspects, techniques, and/or components described hereby may be utilized to improve the technical fields of query analysis, decision making, data processing, and data lineage.

In several embodiments, components described hereby may provide specific and particular manners to enable point decisions, with traceable reasoning, for queries while factoring in a variety of influences. In many embodiments, one or more of the components described hereby may be implemented as a set of rules that improve computer-related technology by allowing a function not previously performable by a computer that enables an improved technological result to be achieved. For example, the function allowed may include one or more of the specific and particular techniques disclosed hereby such as identification and determination of influencer preferences based on a query, iterative decision making, and generation of decision lineages.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter. Aspects of the disclosed embodiments may be described with reference to one or more of the following figures. Some of the figures may include a logic flow and/or a process flow. Although such figures presented herein may include a particular logic or process flow, it can be appreciated that the logic or process flow merely provides an example of how the general functionality as described herein can be implemented. Further, a given logic or process flow does not necessarily have to be executed in the order presented unless otherwise indicated. Moreover, not all acts illustrated in a logic or process flow may be required in some embodiments. In addition, a given logic or process flow may be implemented by a hardware element, a software element executed by a processor, or any combination thereof.

FIG. 1 illustrates exemplary aspects of a point decisioner 102 according to some embodiments. The point decisioner 102 may utilize a query 104, one or more preference sets 106 and access to one or more data sources 108 to determine preferences, identify options, and generate decision sets 110. In several embodiments, the point decisioner 102 may operate in an interactive and/or iterative manner, such as by allowing preferences to be adjusted during iterations. In many embodiments, the decision sets 110 may include a decision lineage that traces influences, processes, preferences, and considerations used in arriving at a decision. The decision sets 110 may include a variety of point decisions and the corresponding outcomes and decision lineages. It will be appreciated that one or more components of FIG. 1 may be the same or similar to one or more other components disclosed hereby. Embodiments are not limited in this context.

In various embodiments, the point decisioner 102 may decompose a query 104 to determine a variety of preferences that are relevant to the query 104. In various such embodiments, the point decisioner 102 may acquire values for the preference for influencers associated with the query. For example, the point decisioner 102 may utilize a user interface to acquire preferences directly from influencers. Alternatively, or additionally, the point decisioner 102 may utilize the data sources 108 to determine the preferences of influencers, such as by mining social media data or accessing user profiles. In various embodiments, influencers may include a set of people, entities, regulations, and the like that can impact a decision. For example, influencers may include various managers, executives, employees, a regulatory body, a set of governing laws. In many embodiments, the point decisioner 102 may utilize data sources 108 to determine an initial decision options set. For example, if the query 104 was directed to finding a new office space in a town for a company, the initial decision options set may comprise all available office space in the town as determined by point decisioner 102 using data sources 108. In many embodiments, the decision options set may be determined based on constant parameters in the query.

The point decisioner 102 may utilize the query 104, preference sets 106, and data sources 108 to generate decision sets 110. The decision sets 110 may include one or more point decisions along with various outcomes of the point decisions with respect to the different influencers. As will be described in more detail below, the point decisioner 102 may create a set of conditional gates and filters based on the query 104, the preference sets 106, and the data sources 108 to arrive at a point decision. In some embodiments, the outcomes may be tied to the influencer preferences. For example, in a query for identifying a house to purchase, if a first influencer preferred a house that is close to restaurants, the outcomes for the first influencer may include the restaurants in proximity to the house identified in the point decision. In another example, if a second influencer preferred a brick house with a pool and a garden, the outcomes for the second influencer would include that the house identified in the point decision is a brick house with a garden and a hot tub.

In many embodiments, the point decisioner 102 may enable influencers to adjust and/or reprioritize their preferences based on the outcomes. Continuing with the previous example, the second influencer could adjust their preferences to prioritize a pool above brick and the point decisioner 102 may identify another house based on the updated preferences. In several embodiments, the point decisioner 102 may automatically adjust or reprioritize preferences to generate the decision sets 110. In several such embodiments, this may enable influencers to see different decisions and corresponding outcomes that they would not have otherwise considered. Additionally, the corresponding outcomes enable influencers to readily ascertain the costs versus benefits of different decisions and different preferences.

Figure 2:
FIG. 2 illustrates a block diagram of an exemplary point decisioner according to one or more embodiments described herein.

FIG. 2 illustrates a block diagram of a point decisioner 202 according to some embodiments. In many embodiments the point decisioner 202 may operate to provide end-to-end decision making support in an efficient and traceable manner. In the illustrated embodiment, point decisioner 202 includes a query analyzer 204, a condition analyzer 206, a filter administrator 208, a point estimator 210, an outcome analyzer 212, a feedback manager 214, an iteration adjuster 216, a table manager 218, a data source manager 220, and a lineage constructor 222. It will be appreciated that one or more components of FIG. 2 may be the same or similar to one or more other components disclosed hereby. For example, the point decisioner 202 may be the same or similar to point decisioner 102. Embodiments are not limited in this context.

The query analyzer 204 may generally operate to determine what is needed based on a query. For example, query analyzer 204 may determine preference sets and decision options based on a query. In many embodiments, the query analyzer 204 may determine an objective associated with a query. For example, the object for a query regarding identifying a house for sale may include purchasing a house. In various embodiments, the query analyzer 204 may determine the influencers associated with a query. For example, the query analyzer 204 may request that a user identify and prioritize the influencers for a query.

The condition analyzer 206 may determine a set of conditional gates for the decision options based on the preferences. Similarly, the filter administrator 208 may determine a set of filters for the decision options based on the preferences.

The point estimator 210 may determine a point decision based on the options remaining after the conditional gates and the filters. In various embodiments, the superset may refer to the remaining options at a current stage of the decision making process. Accordingly, after the conditional gates and filters, the remaining options may be referred to as the superset. On the other hand, before the conditional gates and filters, the initial decision options set may be referred to as the superset.

In several embodiments, the point estimator 210 may utilize machine learning to arrive at a point decision. For example, the point estimator 210 may include a machine learning model that takes the preferences and the superset after the conditional gates and filters as input and outputs a point decision.

The outcome analyzer 212 may determine the outcomes associated with a point decision. In some embodiments, the outcomes may include a result corresponding to each preference of each influencer, or a subset thereof.

The feedback manager 214 may operate to communicate point decisions and outcomes to the influencers. Additionally, the feedback manager 214 may enable influencers to adjust their preferences in response to the point decisions and outcomes. In some embodiments, such as those in which preferences are automatically adjusted, the feedback manager 214 may not be utilized.

The iteration adjuster 216 may adjust various parameters based on the adjusted preferences. In some embodiments, the iteration adjuster 216 may interoperate with condition analyzer 206 and/or filter administrator 208 to generate new sets of conditional gates and filters based on the adjusted preferences. In various embodiments, the iteration adjuster 216 may automatically adjust various preferences, such as when feedback manager 214 is not utilized.

The table manager 218 may operate to maintain various tables and datasets associated with decisions. For example, the table manager 218 may store one or more of preferences sets, decision sets, decision lineages, and queries, such as in query tables or decision tables. The data source manager 220 may identify, access, and retrieve data from a variety of data sources. For example, the data source manager 220 may access social media to acquire social media data relevant to influencers. In another example, the data source manager 220 may access user profile data, such as a banking profile. In yet another example, data source manager 220 may search publicly available data for relevant information, such as for determining preferences or values for preferences. In various embodiments, the point decisioner 202 may include, or be communicatively coupled with, one or more databases. For example, a staging database may be utilized to store preference sets, decision options, settings, and the like. In another example, a results database may be used to store decision sets, decision lineages, tables generated by table manager 218, and the like.

In some embodiments, the data source manager 220 may identify common characteristics associated with the subject or objective of a query (e.g., houses or buying a house). In some such embodiments, the data source manager 220 (e.g., in conjunction with query analyzer 204) may determine preferences associated with a house include the number of bathrooms and the number of bedrooms. Additionally, point decisioner 202 may then solicit preferences from influencers regarding the number of bathrooms and the number of bedrooms. In various embodiments, the The lineage constructor 222 may generate decision lineages for different point decisions. In various embodiments, the lineage constructor 222 may utilize metadata to generate decision lineages. For example, decision lineages may be generated based on one or more of decision set metadata, decision metadata, influencer metadata, and outcome metadata. In some embodiments, lineage constructor 222 may utilize tables (e.g., from table manager 218) to generate decision lineages.

Figure 3A:
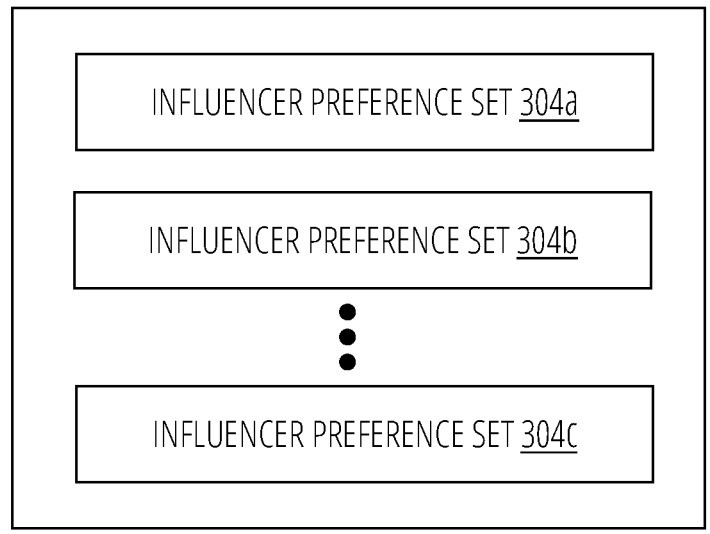
FIG. 3A illustrates a block diagram of exemplary preference sets according to one or more embodiments described herein.

FIG. 3A illustrates a block diagram of preference sets 302 according to some embodiments. The preference sets 302 include one or more sets of influencer preferences 304a, 304b, 304c. In various embodiments, there may be a different set of influencer preferences for each influencer. In many embodiments, different influencers may have different priority levels. In some embodiments, each set of influencer preferences may include the same set of preferences. In other embodiments, different sets of influencers may include different sets of preferences. In one embodiment, the set of preferences for an influencer may be determined, at least in part, based on the priority level of the influencer. For example, the preference set for an executive may include the cost of a new office space in addition to the location of the new office space. However, the preference set for a manager may include the location of the new office space, but not the cost of the new office space. It will be appreciated that one or more components of FIG. 3A may be the same or similar to one or more other components disclosed hereby. For example, preferences sets 302 may be the same or similar to preference sets 106. Embodiments are not limited in this context.

FIG. 3B illustrates a block diagram of one or more influencer preference sets 304a, 304b, 304c in preference sets 302 according to some embodiments. Each of the influencer preference sets includes one or more preferences with corresponding values and influencer settings. In the illustrated embodiment, each influencer preference set includes the same set of preferences with different values for the preferences. However, it will be appreciated that in some embodiments, different influencer preference sets may include different preferences. Accordingly, influencer preference set 304a includes preference 306a with value(s) 308a, preference 306b with value(s) 310a, preference 306c with value(s) 312a, and influencer settings 314a; influencer preference set 304b includes preference 306a with value(s) 308b, preference 306b with value(s) 310b, preference 306c with value(s) 312b, and influencer settings 314b; and influencer preference set 304c include preference 306a with value(s) 308c, preference 306b with value(s) 310c, preference 306c with value(s) 312c, and influencer settings 314c. It will be appreciated that one or more components of FIG. 3B may be the same or similar to one or more other components disclosed hereby. Embodiments are not limited in this context.

As used herein, preferences and values can take a variety of forms. In some embodiments, a value for a preference may include a ranking of objects. For example, a value for a preference may comprise a ranking in order of preference for dogs, cats, and fish. In various embodiments, a value for a preference may include a numerical value. For example, a value for a preference may include the zip code of an influencers top location for purchasing a home. In many embodiments, a value for a preference may include a Boolean value. For example, a value for a preference may include 'true' for a preference of whether or not a lease would be considered as opposed to an outright purchase. In several embodiments, a value for a preference may include a selection of one or more items from a list. For example, a value for a preference may include identifying the 2 most import factors in a list of factors. In many embodiments, an influencer may rank each preference in the preference set relative to one another.

Figure 4A:
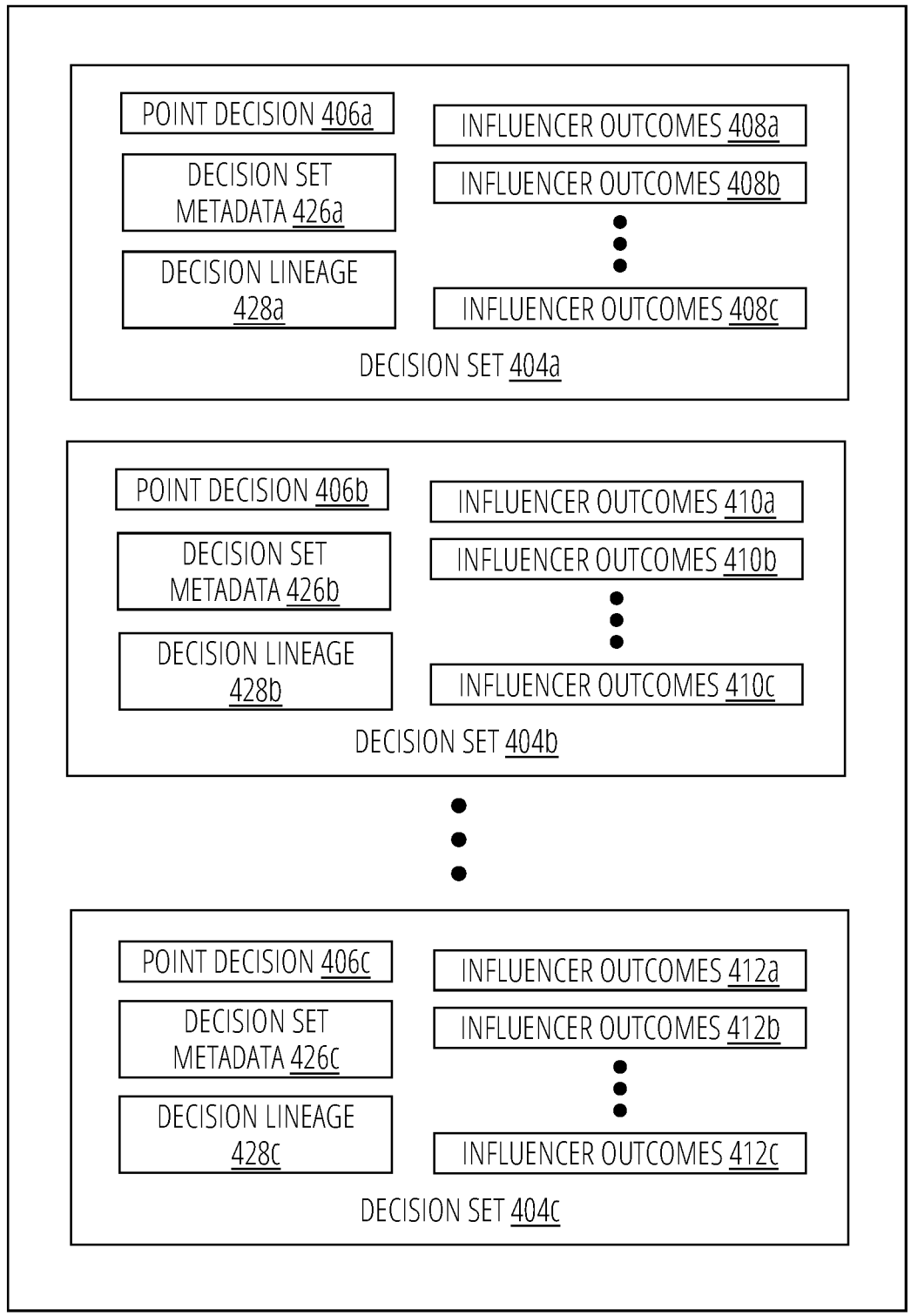
FIG. 4A illustrates a block diagram of exemplary decision sets according to one or more embodiments described herein.

FIG. 4A illustrates a block diagram of decision sets 402 according to some embodiments. In the illustrated embodiment, decision sets 402 include one or more decision sets 404a, 404b, 404c. Each decision set may include a point decision, decision set metadata, a decision lineage, and influencer outcomes corresponding to the point decision. Accordingly, decision set 404a includes point decision 406a, one or more influencer outcomes 408a, 408b, 408c, decision set metadata 426a, and decision lineage 428a; decision set 404b includes point decision 406b, one or more influencer outcomes 410a, 410b, 410c, decision set metadata 426b, and decision lineage 428b; and decision set 404c includes point decision 406c, one or more influencer outcomes 412a, 412b, 412c, decision set metadata 426c, and decision lineage 428c. It will be appreciated that one or more components of FIG. 4A may be the same or similar to one or more other components disclosed hereby. For example, decision sets 402 may be the same or similar to decision sets 110. Embodiments are not limited in this context.

Figure 4B:
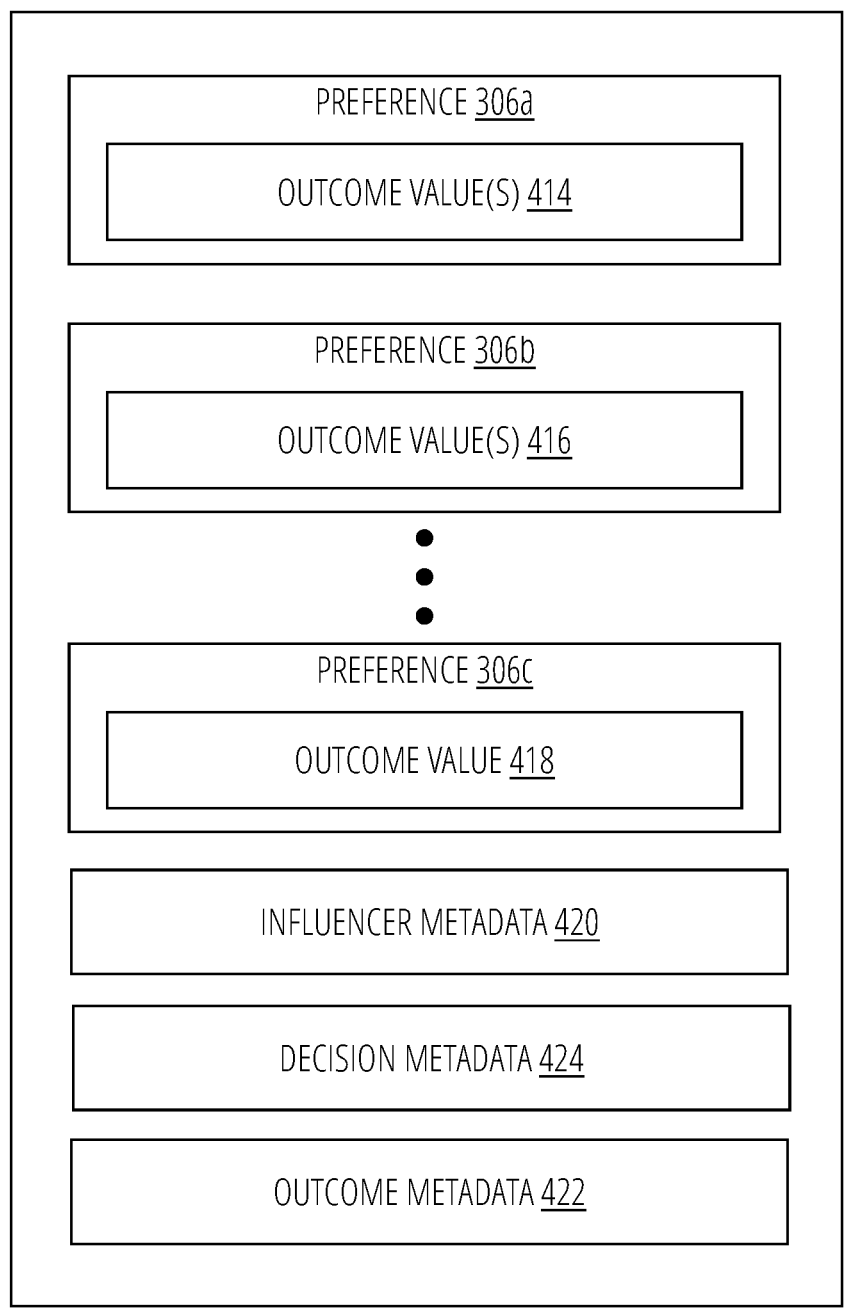
FIG. 4B illustrates a block diagram of exemplary influencer outcomes according to one or more embodiments described herein.

FIG. 4B illustrates a block diagram of influencer outcomes 408a according to some embodiments. In the illustrated embodiment, influencer outcomes 408a includes one or more preferences 306a, 306b, 306c with corresponding outcome value(s) 414, 416, 418, influencer metadata 420, decision metadata 424, and outcome metadata 422. It will be appreciated that one or more components of FIG. 4B may be the same or similar to one or more other components disclosed hereby. Embodiments are not limited in this context.

The outcome values may reflect the outcomes associated with the corresponding point decision for a respective influencer. For example, if an influencer identified brick as a preference for a house and the point decision identifies a brick house, then the outcome value would reflect that the brick preference is satisfied by the point decision. In another example, if an influencer identified a zip code as a preferred location and the point decision identifies a house one zip code over, the outcome value would reflect that although the house is not in the preferred zip code, it is located adjacent to the preferred zip code.

The influencer metadata 420 may include relevant data about the influencer, such as name, address, priority level, gender, and the like. In various embodiments, influencer metadata 420 may be utilized to automatically determine influencer preferences. For example, if the influencer metadata 420 indicates that the influencer has an elementary aged child, then the point decisioner may automatically determine that the influencer prefers houses in proximity of elementary schools. In many embodiments, influencer metadata 420 may include the preferences of the influencer utilized to arrive at the point decision. In many embodiments, influencer preferences may be weighted based on their priority relative to other influencers.

Decision metadata 424 may include relevant data about the decision, such as when or how the decision was made and what the controlling and/or dominator factors were. For example, the decision metadata 424 may indicate the conditional gates and filters used and/or the machine learning model used. In another example, the decision metadata 424 may indicate which preferences of influencers were the most contentious or at odds with each other. In many embodiments, the decision metadata 424 may include data specifying the conditional gates, filters, and machine learning models utilized to arrive at the decision. In several embodiments, the decision metadata 424 may include sufficient information to enable the decision process to be reconstructed.

Outcome metadata 422 may include relevant data about the different outcomes, such as what the controlling and/or dominating factors were. For example, outcome metadata 422 may indicate that a preferred zip code was a dominating factor because few homes are for sale in the preferred zip code. In another example, the outcome metadata 422 may indicate whether the objective of the query was adhered to.

Figure 5A:
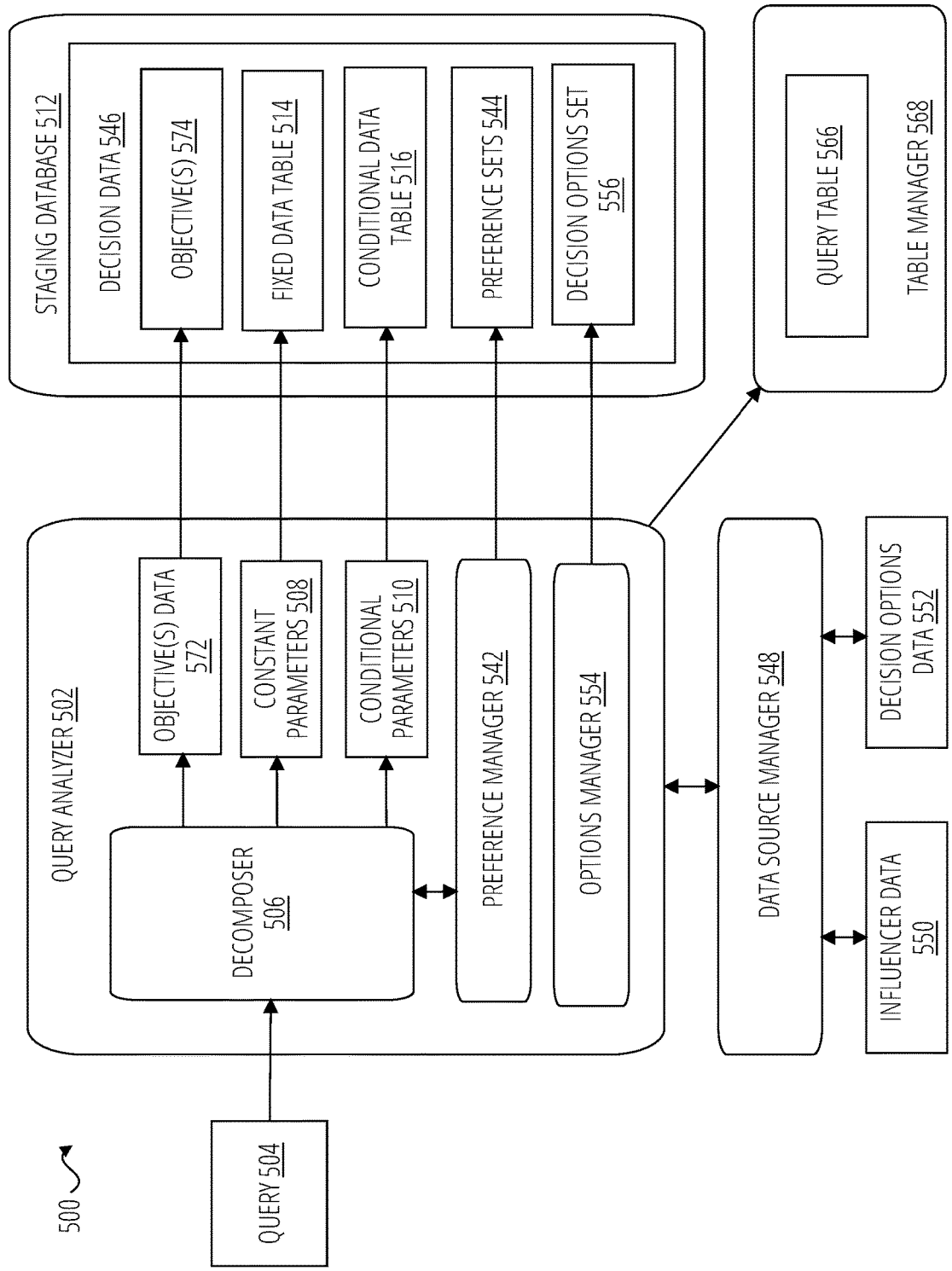
FIGS. 5A and 5B illustrate various operational aspects of a point decisioner according to one or more embodiments described herein.
Figure 5B:
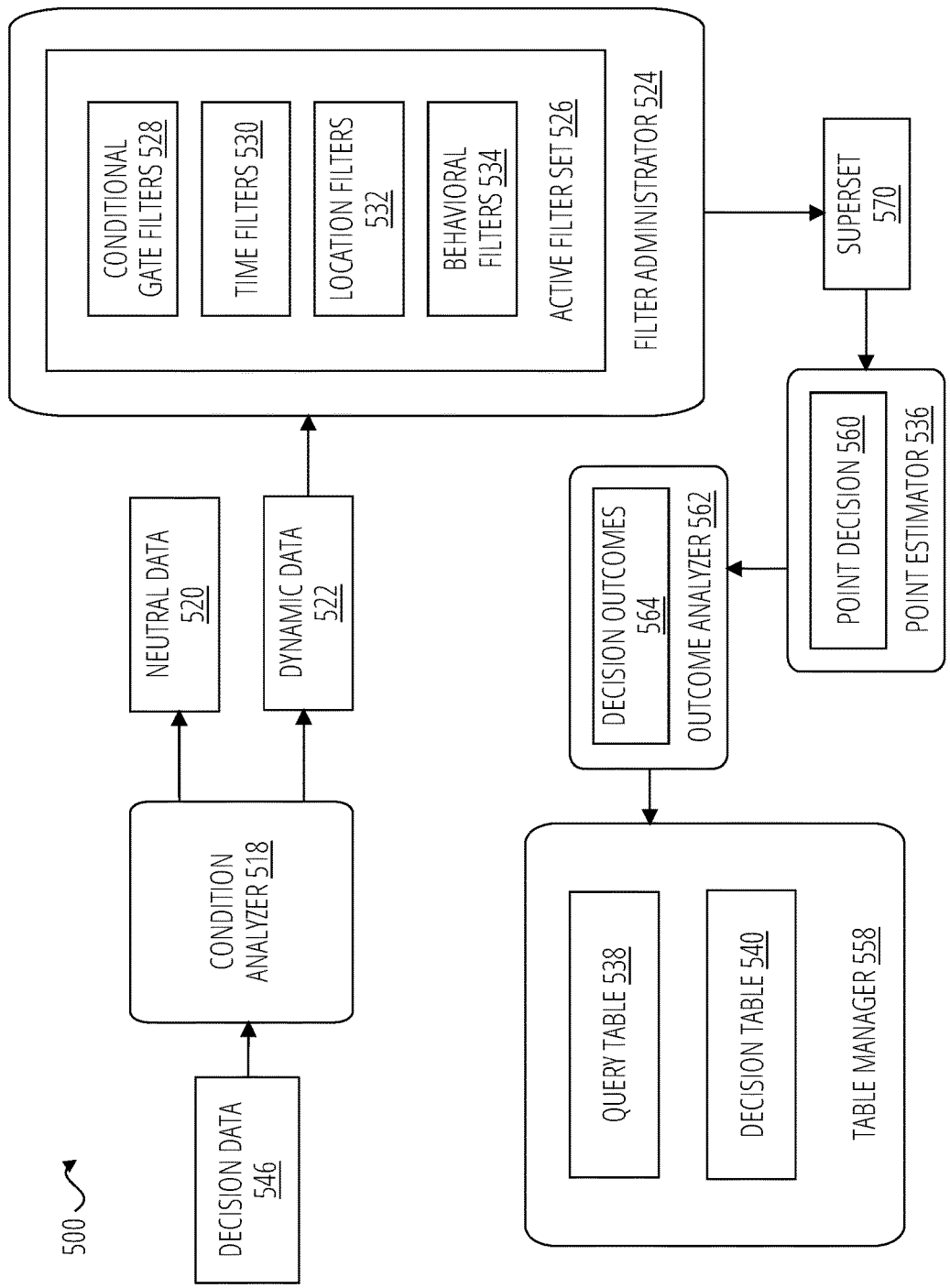

FIGS. 5A and 5B illustrate various operational aspects of a point decisioner 500 according to some embodiments. Generally, the point decisioner 500 may analyze a query to determine objectives data, constant parameters, and conditional parameters. One or more of the objectives data, constant parameters, and conditional parameters may then be utilized to determine preference sets and a decision options set. Values for the preference sets may be obtained for each influencer and a record of the query may be created in a query table. The point decisioner 500 may then classify data as neutral (i.c., does not impact the decision) or dynamic (i.c., does impact the decision). Classifying data as neutral or dynamic improves efficiency of the system, such as by avoiding processing of data that does not impact the decision. The point decisioner 500 may then utilize the dynamic data to arrive at one or more point decisions and utilize the one or more point decisions to determine corresponding decision outcomes. The point decisions and/or decision outcomes may then be stored, as decision sets. In some embodiments, the decision sets may be stored in a decision table. In other embodiments, the decision table may be updated with identifying data and a pointer to the storage location of the decision sets. It will be appreciated that one or more components of FIGS. 5A and/or 5B may be the same or similar to one or more other components disclosed hereby. For example, point decisioner 500 may be the same or similar to other point decisioners described hereby, such as point decisioner 202. Embodiments are not limited in this context.

In the illustrated embodiment, the point decisioner 500 includes a query analyzer 502. staging database 512, a data source manager 548, a table manager 568, a condition analyzer 518, a filter administrator 524, a point estimator 536, an outcome analyzer 562, and table manager 558. The following description of the operation of the point decisioner 500 utilizes a common example based around a query to identify a house to purchase for a husband and wife (the influencers). The query analyzer 502 may include a decomposer that breaks the query 504 down into objective(s) data 572, constant parameters 508, and conditional parameters 510. The objective(s) data 572 may identify the objective of the query. For example, objective(s) data 572 may identify purchasing a house as the objective of the query 504.

In various embodiments, constant parameters 508 may refer to data that remains constant through the decision process. For example, constant parameters 508 may include a house to purchase. In another example, constant parameters 508 may include a specific location when the query is for finding a house in the specific location. In some embodiments, parameters that are considered deal breakers (i.e., will not consider a house unless is has 'X') are treated as constant parameters 508. Conditional parameters 510 may refer to data that can change through the decision process. For example, conditional parameters 510 may include house color, number of bedrooms, number of bathrooms, design style, proximity to schools, and the like. In many embodiments, the conditional parameters 510 and constant parameters 508 may include the preferences. Accordingly, decomposer 506 and preference manager 542 may interoperate to identify the constant parameters 508 and conditional parameters 510. In the illustrated embodiment, query analyzer 502 may store the objective(s) data 572 as objective(s) 574 of decision data 546 in staging database 512, constant parameters 508 in fixed data table 514 of decision data 546, and conditional parameters 510 in conditional data table 516 of decision data 546.

The preference manager 542 may determine a set of preferences corresponding to the query 504. In some embodiments, the set of preferences, or one or more portions thereof, may be defined by users. For example, an administrator may be responsible to defining one or more of influencers, objectives, preferences, and decision options. In many embodiments, the set of preferences, or one or more portions thereof, may be automatically determined. In many such embodiments, the decomposer 506 and preference manager 542 may analyze the query to determine the preference set. For example, preference manager 542 may determine number of bedrooms, number of bathrooms, square footage, and location as preferences associated with selecting a house to purchase. In some embodiments, the preference manager 542 may then utilize the data source manager 548 to obtain values for the preferences for each influencer as influencer data 550.

In some embodiments, the data source manager 548 may actively query influencers for their preferences. In various embodiments, the data source manager 548 may mine one or more portions of influencer data 550 from available data. For example, the query analyzer 502 may determine the wife wants a house that has at least two bedrooms based on a social media post indicating that the husband and wife have one child. In another example, values for preference may be determined based on challenge questions used for login credentials. In such an example, the challenge question could ask for a user's favorite color and the preference manager 542 may determine the answer to the challenge question as the value for a preference regarding color preferences. The preferences manager may store the preference sets 544 for the influencers in preference sets 544 of decision data 546 in staging database 512.

The options manager 554 may interoperate with data source manager 548 to determine a set of decision options corresponding to the query 504. For example, decision options data 552 may include listing data for all homes for sale that satisfy the constant parameters 508. The options manager 554 may process the decision options data 552 to generate decision options set 556. The options manager 554 may store the decision options set 556 in decision data 546 of staging database 512. Additionally, the table manager 568 may interoperate with query analyzer 502 to store the query, or identifying information for the query, in query table 566. In various embodiments, query table 566 may include a log of queries submitted to the query analyzer 502.

Referring the FIG. 5B, the decision data 546 may be analyzed, processed, and transformed by various components of the point decisioner 500 to arrive at point decision 560 and the corresponding decision outcomes 564. In various embodiments, the condition analyzer 518 may separate the decision data 546 into neutral data 520 and dynamic data 522. In various such embodiments, the neutral data 520 may refer to data that does not have any impact on the decision and dynamic data 522 may refer to data that does have an impact on the decision. For example, if there is no preference regarding location, then location data regarding a potential home to purchase would be considered neutral data 520. However, if there is a preference for the location to be on a certain street, then the street address of a potential home to purchase would be considered dynamic data 522. In another example, if there is no preference regarding exterior house color, then the exterior color of potential homes to purchase would be considered neutral data 520. In several embodiments, the condition analyzer 518 may construct a series of conditional gates (e.g., logic or quantum) to separate dynamic and neutral data. For example, the conditional gates may result in data being classified as dynamic when a preference is associated with the data and neutral when a preference is not associated with the data. In some such examples, the data being classified may correspond to characteristics of decision options (e.g., exterior color, square footage, location, etcetera).

Once the dynamic data 522 is separated from the neutral data 520, filter administrator 524 may construct an active filter set 526 to narrow down the decision options to a superset 570 of remaining decision options that sufficiently satisfy the preference sets. For example, the superset 570 may include all houses with at least 3 bedrooms, at least 2 bathrooms, and located in the desired area. The filters in the active filter set 526 may be created by filter administrator 524 based on various parameters and data of the point decisioner 500 (e.g., dynamic data, decision data, preference sets, decision options set, etcetera). In the illustrated embodiments, the active filter set 526 includes conditional gate filters 528, time filters 530, location filters 532, and behavioral filters 534.

In some embodiments, sufficiently satisfying the preference sets may refer to those decision options that at least partially satisfy each preference in the preference sets for at least one influencer. For example, if the husband prefers a white exterior and the wife prefers a blue exterior, then only houses with blue and/or white exteriors would remain in the superset 570.

The point estimator 536 may then utilize the superset 570 as input to identify point decision 560. In various embodiments, the point decision 560 includes the decision option that is identified as the best by the point estimator 536. In many embodiments, the point estimator 536 may include one or more machine learning algorithms that identify the best option based on the superset 570. In many such embodiments, the machine learning algorithms may be trained on decisions made by others with similar preferences and similar queries.

The outcome analyzer 562 may then utilize the point decision 560 to determine decision outcomes 564 regarding the point decision 560. In many embodiments, the decision outcomes 564 may include data regarding the effects of the point decision 560 for each influencer. In some embodiments, the decision outcomes 564 may include the effects of the point decision 560 on the preferences for each influencer. The outcome analyzer 562 may compare the point decision 560 to the objective(s) 574 to determine the point decision 560 adheres to the objective(s) 574.

In various embodiments, the outcome analyzer 562 and/or point estimator 536 may interoperate with the table manager 558 to generate, or update, decision table 540 based on the point decision 560 and decision outcomes 564. In various embodiments, the decision table 540 may include one or more decision sets (or identifying/summary information with pointers to the corresponding decision sets. In some embodiments, there may be a one-to-one correspondence between the query table 538 and the decision table 540. In other words, for each query submitted to the point decisioner 500 and logged in the query table 538 there may be a corresponding decision entry in the decision table 540. In several embodiments, the decision table 540 may serve as a log of decisions generated by point decisioner 500 and/or query table 538 may server as a log of queries submitted to the point decisioner 500. In some embodiments, the query table 538 may include or be referred to as a query index.

Figure 6:
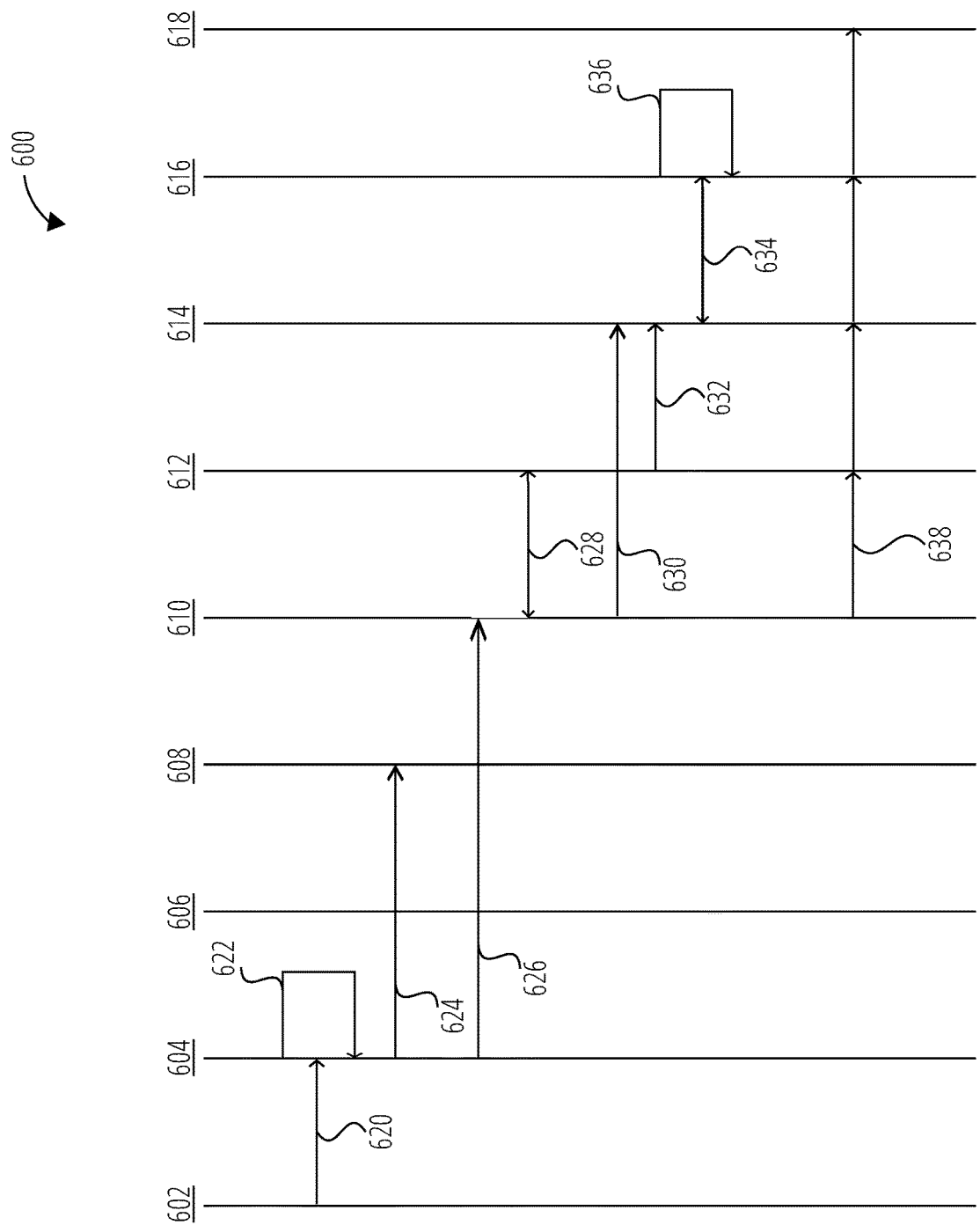
FIG. 6 illustrates an exemplary process diagram for a point decisioner according to one or more embodiments described herein.

FIG. 6 illustrates a process diagram 600 for a point decisioner according to some embodiments. The process diagram 600 may include various processes involving with one or more of a query 602, a query analyzer 604, a data source 606, a staging database 608, conditional gates 610, filters 612, a query index 614, a point estimator 616, and a decision 618. It will be appreciated that one or more components of FIG. 6 may be the same or similar to one or more other components disclosed hereby. For example, query analyzer 604 may be the same or similar to query analyzer 502. Embodiments are not limited in this context.

At process 620, the query 602 may be received at the query analyzer 604. At process 622, the query analyzer 604 may evaluate the query and transform it into constant and condition components. The query analyzer 604 may then, at process 624, push the decomposed components into a fixed data table and a conditional data table in staging database 608. In many embodiments, the staging database 608 can refresh based on the interactional components (e.g., conditional gates, filters, etcetera). At process 626, the conditional decomposed component table is analyzed with the conditional gates 610 where the gates further classify the analyzed output into neutral data and dynamic data. As previously discussed, separating neutral and dynamic data reduces processing burdens associated with arriving at a decision.

At process 628, the conditional gates 610 may interact with the filter dynamics parameters (capable of fine tuning to arrive at a point decision). In many embodiments, the conditional gates 610 may be generated by a condition analyzer, such as condition analyzer 518. In some embodiments, this may occur through a plurality of iterations that cause parameter adjustments. In various embodiments, a conditional analyzer and a filter administrator may be utilized to arrive at a point decision without the use of a machine learning model, such as by using a series of conditional gates and filters. In several embodiments, the conditional gates may include logic gates and/or quantum gates. At process 630, the conditional gates 610 may interact with the filters 612 (e.g., via respective conditional analyzer and filter administrator modules) to build the gates as appropriate. In one embodiments, the filters 612 may be generated by a filter administrator, such as filter administrator 524. In some embodiments, multiple filters could be applied at a single time (e.g., one to many relationship). In many embodiments, the neutral data may be pushed to a fixed data table at process 630.

At process 632, the filter dynamics levels (e.g., filters used) may be recorded, such as in the query index or in decision metadata. At processes 634 and 636, the point estimator 616 may operate to sequence the query index 614, such as based on the query condition and filters. Additionally, the point estimator 616 may have multiple paths (e.g., traceback to the filters and conditional gates for each decision). At process 638, the point decision may be drawn from the interaction of the conditional gates, filter dynamics, decision sets, tables, and decision lineages.

Figure 7:
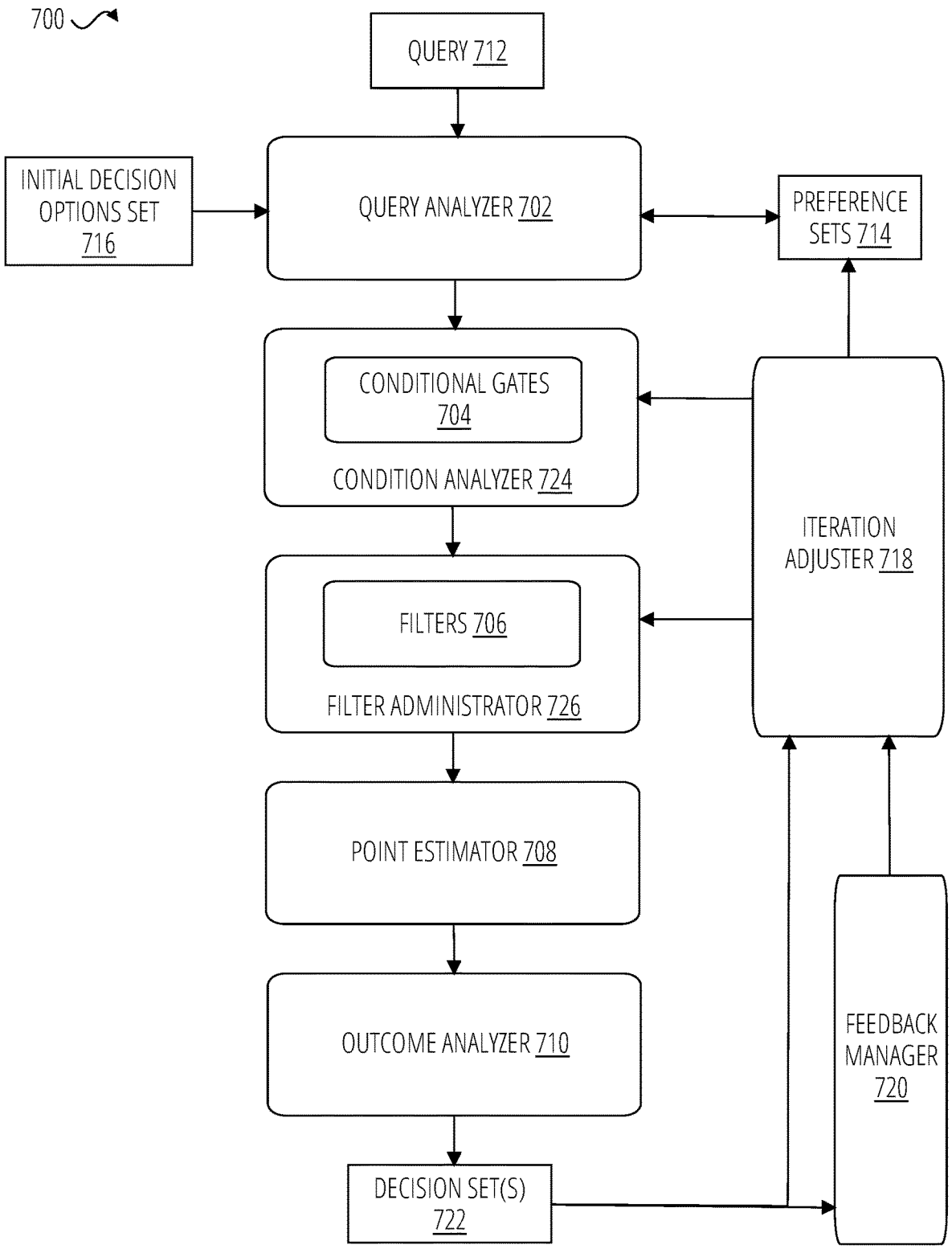
FIG. 7 illustrates various operational aspects of a point decisioner according to one or more embodiments described herein.

FIG. 7 illustrates various operational aspects of a point decisioner 700 according to some embodiments. Generally, the operational aspects discussed with respect to point decisioner 700 concern performing iterations. In the illustrated embodiment, the point decisioner 700 includes a query analyzer 702, a condition analyzer 724 with a set of conditional gates 704, a filter administrator 726 with a set of filters 706, point estimator 708, outcome analyzer 710, feedback manager 720, and iteration adjuster 718. The query analyzer 702, conditional gates 704, filters 706, point estimator 708, and outcome analyzer 710 may function to generate decision set(s) 722 based on the query 712 and the initial decision options set 716. It will be appreciated that one or more components of FIG. 7 may be the same or similar to one or more other components disclosed hereby. For example, condition analyzer 724 may be the same or similar to condition analyzer 518, filter administrator 726 may be the same or similar to filter administrator 524, and/or filters 706 may be the same or similar to active filter set 526. Embodiments are not limited in this context.

In various embodiments, the feedback manager 720 may present the relevant portions of the decision set(s) 722 to the appropriate influencer(s). The appropriate influencer(s) may then provide feedback on the decision set(s) 722, such as by adjusting one or more preferences. In some embodiments, the feedback manager 720 may make suggestions regarding adjusting preferences. For example, the feedback manager 720 may identify and indicate the relevant influencer that if they are willing to bend on a first preference (e.g., exterior house color), then a number of additional options can be evaluated in the next iteration. Based on the feedback, the iteration adjuster 718 may adjust, or cause to be adjusted, one or more of the preference sets 714, conditional gates 704, and filters 706, and then initiate generation of one or more new decision set(s) 722 based on the updated parameters. In various embodiments, the condition analyzer may generate an initial set of conditional gates 704, such as based on input from query analyzer 702, and then revise the initial set of conditional gates 704 based on input from iteration adjuster 718. Similarly, the filter administrator 726 may generate an initial set of filters 706, such as based on input from condition analyzer, and then revise the initial set of filters 706 based on input from iteration adjuster 718. In some embodiments, the iteration adjuster 718 may automatically adjust parameters (e.g., without receiving feedback), such as in preference sets 714. For example, iteration adjuster 718 may hold a first set of preferences constant while adjusting a second set of preferences. In several embodiments, condition analyzer 724 may adjust conditional gates 704 and/or filter administrator 726 may adjust filters 706 based on adjusted parameters. In this manner, the point decisioner 700 may identify point decisions that would not have otherwise been considered.

Figure 8:
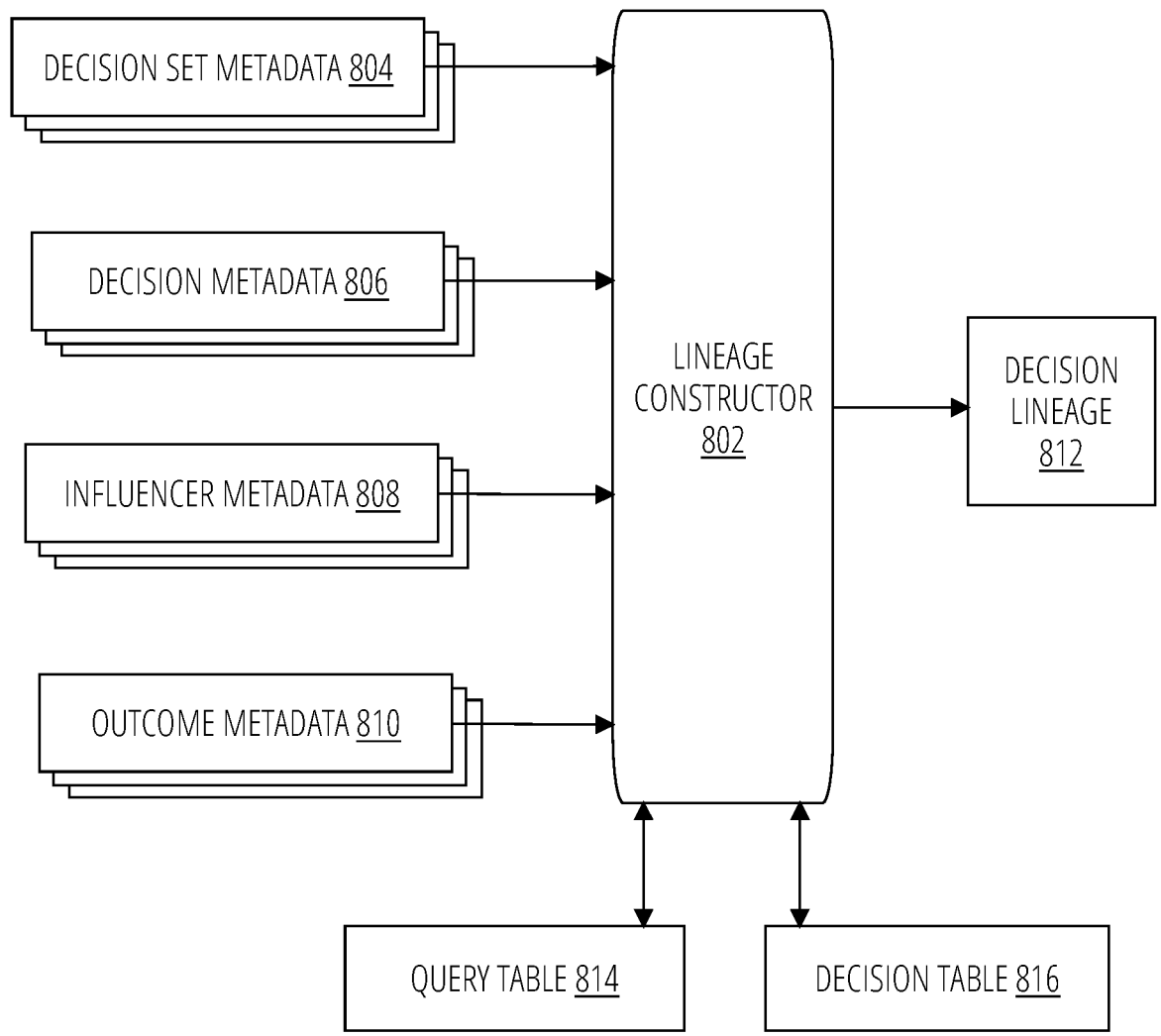
FIG. 8 illustrates various operational aspects of a lineage constructor according to one or more embodiments described herein.

FIG. 8 illustrates various operational aspects of a lineage constructor 802 according to some embodiments. The lineage constructor 802 may generally operate to memorialize and summarize point decisions by generating a decision lineage 812. Accordingly, the decision lineage 812 may include a record of each decision and a summary of how the decision was arrived at. In many embodiments, the decision lineage 812 may enable a point decisioner to reconstruct, retrieve, and/or specify the entire decision making process including, for example, decision options, the conditional gates, the filters, the machine learning model, the query, the conditional parameters, the constant parameters, the neutral data, the dynamic data, the preferences, and the like. In the illustrated embodiment, the lineage constructor 802 may generate the decision lineage 812 based on decision set metadata 804, decision metadata 806, influencer metadata 808, outcome metadata 810, query table 814, and decision table 816. It will be appreciated that one or more components of FIG. 8 may be the same or similar to one or more other components disclosed hereby. For example, lineage constructor 802 may be the same or similar to lineage constructor 222. Embodiments are not limited in this context.

Figure 9:
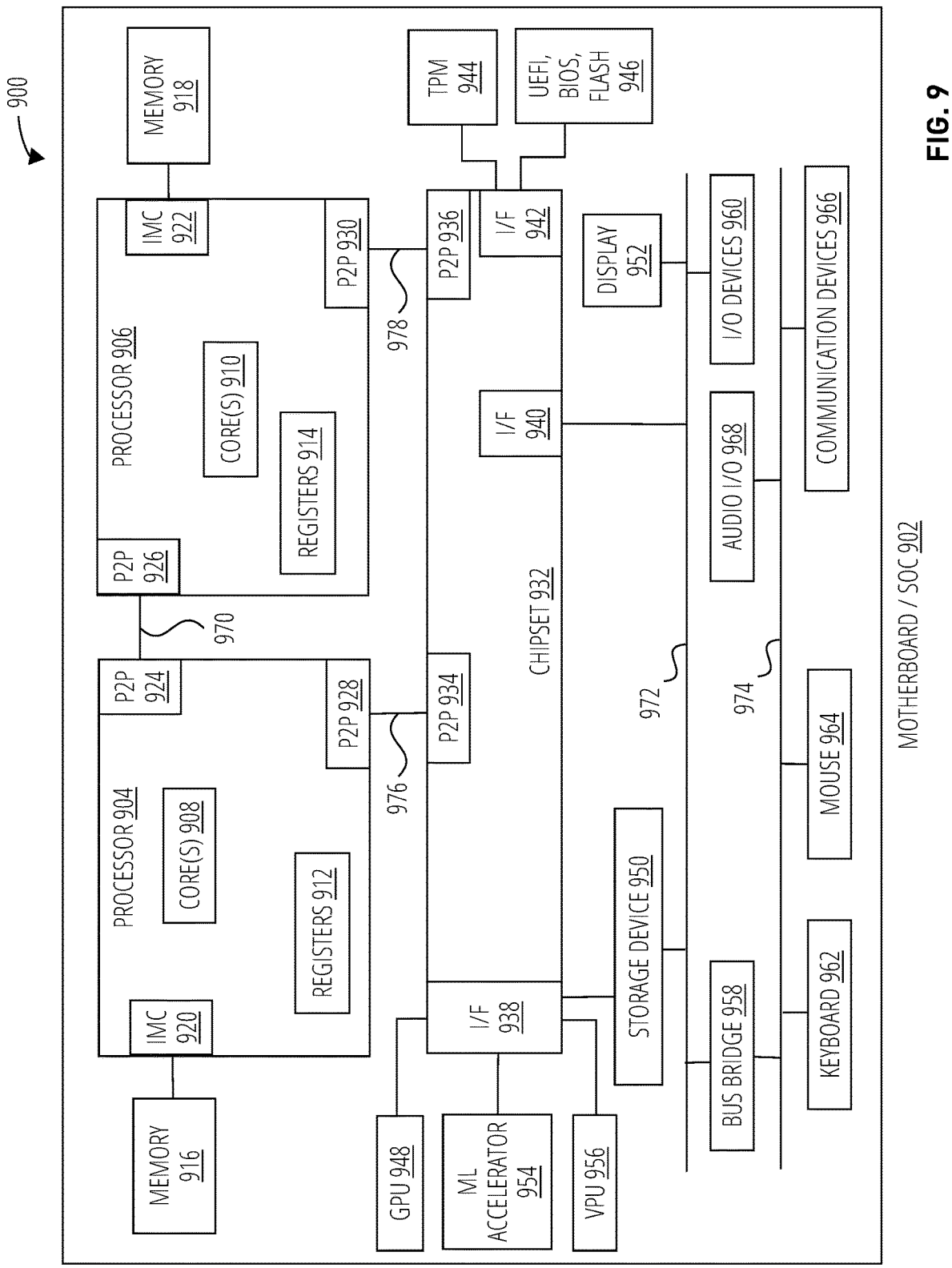
FIG. 9 illustrates exemplary aspects of a computing system according to one or more embodiments described herein.

FIG. 9 illustrates an embodiment of a system 900 that may be suitable for implementing various embodiments described hereby. System 900 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 900 may have a single processor with one core or more than one processor. Note that the term "processor" refers to a processor with a single core or a processor package with multiple processor cores. In at least one embodiment, the computing system 600, or one or more components thereof, is representative of one or more components described hereby, such as point decisioner 102. More generally, the computing system 900 may be configured to implement embodiments including logic, systems, logic flows, methods, apparatuses, and functionality described hereby. The embodiments, however, are not limited to implementation by the system 900.

As used in this application, the terms "system" and "component" and "module" are generally intended to refer to a computer-related entity, either hardware, a combination of hardware and software, software, or software in execution, examples of which are provided by the exemplary system 900. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Although not necessarily illustrated, the computing system 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. Further, the computing system 900 may include or implement various articles of manufacture. An article of manufacture may include a non-transitory computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, encrypted code, and the like, implemented using any suitable high-level, low-level, object-oriented, visual, compiled, and/or interpreted programming language. Embodiments may also be at least partly implemented as instructions contained in or on a non-transitory computer-readable medium, which may be read and executed by one or more processors to enable performance of the operations described herein.

As illustrated in FIG. 9, the system 900 comprises a motherboard or system-on-chip (SoC) 902 for mounting platform components. Motherboard or system-on-chip (SoC) 902 is a point-to-point (P2P) interconnect platform that includes a first processor 904 and a second processor 906 coupled via a point-to-point interconnect 970 such as an Ultra Path Interconnect (UPI). In other embodiments, the system 900 may be of another bus architecture, such as a multi-drop bus. Furthermore, each of processor 904 and processor 906 may be processor packages with multiple processor cores including core(s) 908 and core(s) 910, respectively. While the system 900 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 904 and chipset 932. Some platforms may include additional components and some platforms may only include sockets to mount the processors and/or the chipset. Furthermore, some platforms may not have sockets (e.g., SoC, or the like).

The processor 904 and processor 906 can be any of various commercially available processors. Dual microprocessors, multi-core processors, and other multi-processor architectures may also be employed as the processor 904 and/or processor 906. Additionally, the processor 904 need not be identical to processor 906.

Processor 904 includes an integrated memory controller (IMC) 920 and point-to-point (P2P) interface 924 and P2P interface 928. Similarly, the processor 906 includes an IMC 922 as well as P2P interface 926 and P2P interface 930. IMC 920 and IMC 922 couple the processors processor 904 and processor 906, respectively, to respective memories (e.g., memory 916 and memory 918). Memories 916, 918 can store instructions executable by circuitry of system 900 (e.g., processor 904, processor 906, graphics processing unit (GPU) 948, ML accelerator 954, vision processing unit (VPU) 956, or the like). For example, memories 916, 918 can store instructions for one or more of the components of point decisioner 202. In another example, memories 916, 918 can store data, such as preference sets 302 and decision sets 402. Memory 916 and memory 918 may be portions of the main memory (e.g., a dynamic random-access memory (DRAM)) for the platform such as double data rate type 3 (DDR3) or type 4 (DDR4) synchronous DRAM (SDRAM). In the present embodiment, the memory 916 and memory 918 locally attach to the respective processors (i.e., processor 904 and processor 906). In other embodiments, the main memory may couple with the processors via a bus and/or shared memory hub.

System 900 includes chipset 932 coupled to processor 904 and processor 906. Furthermore, chipset 932 can be coupled to storage device 950, for example, via an interface (I/F) 938. The I/F 938 may be, for example, a Peripheral Component Interconnect-enhanced (PCI-e). In many embodiments, storage device 950 comprises a non-transitory computer-readable medium. Storage device 950 can store instructions executable by circuitry of system 900 (e.g., processor 904, processor 906, GPU 948, ML accelerator 954, vision processing unit 956, or the like). For example, storage device 950 can store instructions for one or more of components of point decisioner 500 or point decisioner 700. In another example, storage device 950 can store data, such as decision data 546. In some embodiments, instructions may be copied or moved from storage device 950 to memory 916 and/or memory 918 for execution, such as by processor 904 and/or processor 906.

Processor 904 couples to a chipset 932 via P2P interface 928 and P2P interface 934 while processor 906 couples to a chipset 932 via P2P interface 930 and P2P interface 936. Direct media interface (DMI) 976 and DMI 978 may couple the P2P interface 928 and the P2P interface 934 and the P2P interface 930 and P2P interface 936, respectively. DMI 976 and DMI 978 may be a high-speed interconnect that facilitates, e.g., eight Giga Transfers per second (GT/s) such as DMI 3.0. In other embodiments, the components may interconnect via a bus.

The chipset 932 may comprise a controller hub such as a platform controller hub (PCH). The chipset 932 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 932 may comprise more than one controller hub such as a chipset with a memory controller hub, a graphics controller hub, and an input/output (I/O) controller hub.

In the depicted example, chipset 932 couples with a trusted platform module (TPM) 944 and UEFI, BIOS, FLASH circuitry 946 via I/F 942. The TPM 944 is a dedicated microcontroller designed to secure hardware by integrating cryptographic keys into devices. The UEFI, BIOS, FLASH circuitry 946 may provide pre-boot code.

Furthermore, chipset 932 includes the I/F 938 to couple chipset 932 with a high-performance graphics engine, such as, graphics processing circuitry or a graphics processing unit (GPU) 948. In other embodiments, the system 900 may include a flexible display interface (FDI) (not shown) between the processor 904 and/or the processor 906 and the chipset 932. The FDI interconnects a graphics processor core in one or more of processor 904 and/or processor 906 with the chipset 932.

Additionally, ML accelerator 954 and/or vision processing unit 956 can be coupled to chipset 932 via I/F 938. ML accelerator 954 can be circuitry arranged to execute ML related operations (e.g., training, inference, etc.) for ML models. Likewise, vision processing unit 956 can be circuitry arranged to execute vision processing specific or related operations. In particular, ML accelerator 954 and/or vision processing unit 956 can be arranged to execute mathematical operations and/or operands useful for machine learning, neural network processing, artificial intelligence, vision processing, etc.

Various I/O devices 960 and display 952 couple to the bus 972, along with a bus bridge 958 which couples the bus 972 to a second bus 974 and an I/F 940 that connects the bus 972 with the chipset 932. In one embodiment, the second bus 974 may be a low pin count (LPC) bus. Various I/O devices may couple to the second bus 974 including, for example, a keyboard 962, a mouse 964, and communication devices 966.

Furthermore, an audio I/O 968 may couple to second bus 974. Many of the I/O devices 960 and communication devices 966 may reside on the motherboard or system-on-chip(SoC) 902 while the keyboard 962 and the mouse 964 may be add-on peripherals. In other embodiments, some or all the I/O devices 960 and communication devices 966 are add-on peripherals and do not reside on the motherboard or system-on-chip (SoC) 902. More generally, the I/O devices of system 900 may include one or more of microphones, speakers, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, displays, augmented/virtual reality devices, printers, actuators, motors, transducers, and the like.

Figure 10:
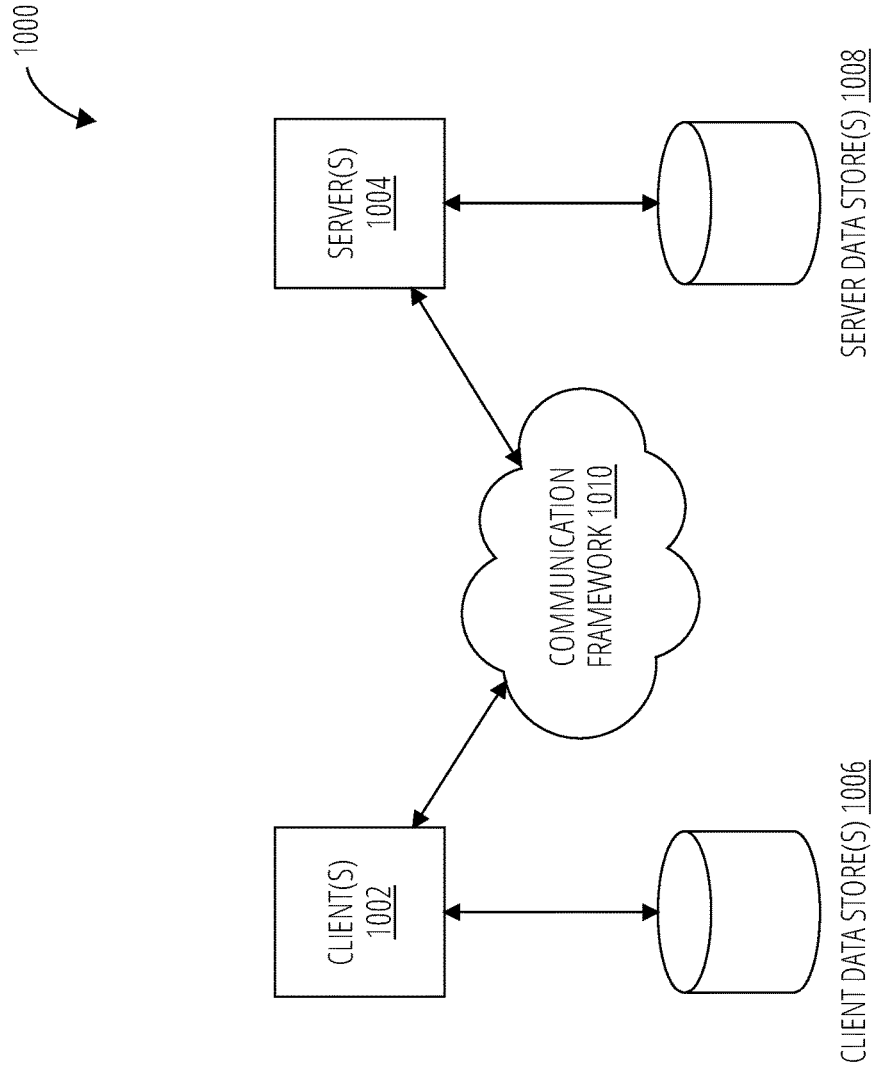
FIG. 10 illustrates exemplary aspects of a communications architecture according to one or more embodiments described herein.

FIG. 10 is a block diagram depicting an exemplary communications architecture 1000 suitable for implementing various embodiments as previously described, such as communications between data sources 108 and point decisioner 102 or query analyzer 502 and staging database 512. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 includes one or more client(s) 1002 and server(s) 1004. In some embodiments, each client 1002 and/or server 1004 may include a computing system (e.g., system 900) The server(s) 1004 may implement one or more devices of point decisioner 202. The client(s) 1002 and the server(s) 1004 are operatively connected to one or more respective client data store(s) 1006 and server data store(s) 1008 that can be employed to store information local to the respective client (s) 1002 and server(s) 1004, such as cookies and/or associated contextual information. In various embodiments, any one of server(s) 1004 may implement one or more logic flows or operations described hereby, such as in conjunction with storage of data received from any one of client(s) 1002 on any of server data store(s) 1008. In one or more embodiments, one or more of client data store(s) 1006 or server data store(s) 1008 may include memory accessible to one or more portions of components, applications, and/or techniques described hereby.

The client(s) 1002 and the server(s) 1004 may communicate information between each other using a communication framework 1010. The communication framework 1010 may implement any well-known communications techniques and protocols. The communication framework 1010 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1010 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 1002 and the server(s) 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate.

The various devices, components, modules, features, and functionalities described hereby may include, or be implemented via, various hardware elements, software elements, or a combination of both. Examples of hardware elements may include devices, logic devices, hardware components, processors, microprocessors, circuits, circuitry, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, algorithms, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation. It is noted that hardware, firmware, and/or software elements may be collectively or individually referred to herein as "logic", "circuit", or "circuitry".

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

There are a number of example embodiments described herein.

Example 1 is a computer-implemented method, comprising: identifying a query; deconstructing the query into constant parameters and conditional parameters; generating a decision options set based, at least in part, on the constant parameters; identifying a set of two or more influencers associated with the query; determining a set of preferences and values for the preferences for each influencer; and generating a point decision for the query based on the sets of preferences and values for the preferences for each influencer, wherein the point decision comprises one decision option from the decision options set.

Example 2 is the computer-implemented method of Example 1 that may optionally include generating an outcomes set corresponding to the point decision, wherein the outcomes set indicates a result of the point decision on at least one preference of at least one influencer.

Example 3 is the computer-implemented method of Example 1 that may optionally include altering at least one value for a preference in the set of preferences; and generating a second point decision based on the at least one value altered in the set of preferences.

Example 4 is the computer-implemented method of Example 1 that may optionally include generating a decision lineage for the point decision based on one or more of decision set metadata, decision metadata, influencer metadata, and outcome metadata.

Example 5 is the computer-implemented method of Example 4 that may optionally include that the decision lineage traces one or more of influences, processes, and preferences utilized to generate the point decision.

Example 6 is the computer-implemented method of Example 1 that may optionally include that generation of the point decision includes creating a set of filters based on the sets of preferences and values for the preferences for each influencer to produce a subset of the decisions option set.

Example 7 is the computer-implemented method of Example 6 that may optionally include that generation of the point decision includes providing the subset of the decisions option set to a machine learning model.

Example 8 is the computer-implemented method of Example 7 that may optionally include that the machine learning model is trained based on data from similar queries associated with influencers with similar preferences.

Example 9 is the computer-implemented method of Example 1 that may optionally include that determining the values for the preferences for each influencer comprises mining social media data.

Example 10 is the computer-implemented method of Example 1 that may optionally include that each influencer has a priority level and a respective priority level is utilized to weight the preferences of a respective influencer relative to other influencers.

Example 11 is the computer-implemented method of Example 1 that may optionally include that generating the point decision for the query based on the sets of preferences and values for the preferences for each influencer comprises generating a set of conditional gates based on the sets of preferences and values for the preferences for each influencer; and applying the set of conditional gates to at least a portion of the set of decision options.

Example 12 is the computer-implemented method of Example 11 that may optionally include that the set of conditional gates include at least one quantum gate.

Example 13 is the computer-implemented method of Example 11 that may optionally include that the set of conditional gates include at least one logic gate.

Example 14 is the computer-implemented method of Example 11 that may optionally include that generating the point decision for the query based on the sets of preferences and values for the preferences for each influencer comprises generating a set of filters based on one or more of the set of conditional gates and the sets of preferences and values for the preferences for each influencer; and applying the set of filters to at least a portion of the set of decision options.

Example 15 is an apparatus comprising a processor and a memory storing instructions that, when executed by the processor, cause the processor to perform the computer-implemented method of any of Examples 1 to 14.

Example 16 is a non-transitory machine-readable medium storing computer-executable program code instructions that, when executed by a computing apparatus, cause the computing apparatus to perform the computer-implemented method of any of Examples 1 to 14.

What has been described above includes examples of the disclosed architecture. It is, of course, not possible to describe every conceivable combination of components and/or methodologies, but one of ordinary skill in the art may recognize that many further combinations and permutations are possible. Accordingly. the novel architecture is intended to embrace all such alterations, modifications and variations that fall within the spirit and scope of the appended claims.

The invention claimed is:

1. A computer-implemented method, comprising:
    identifying, by a query analyzer, a query;
    deconstructing, by the query analyzer, the query into objectives data, constant parameters and conditional parameters;
    generating, by a condition analyzer and based on the constant parameters, a decision options set;
    generating, by the condition analyzer and based on the conditional parameters, at least one conditional gate comprising a logic gate or a quantum gate;
    identifying, by a feedback manager, two or more influencers associated with the query, wherein each of the two or more influencers are a person or an entity that set the constant parameters or the conditional parameters of the query;
    determining, by the feedback manager, sets of preferences and values for the sets of preferences for the two or more influencers;
    adjusting, by an iteration adjuster and based on the sets of preferences and the values for the sets of preferences for each influencer, the at least one conditional gate; and
    generating, by a point estimator and based on the at least one adjusted conditional gate, a point decision for the query, wherein the point decision comprises one decision option from the decision options set.

2. The computer-implemented method of claim 1, comprising generating an outcomes set corresponding to the point decision, wherein the outcomes set indicates a result of the point decision on at least one preference of at least one influencer.

3. The computer-implemented method of claim 1, comprising:
    altering at least one value for a preference in the sets of preferences; and
    generating a second point decision based on the at least one value altered in the sets of preferences.

4. The computer-implemented method of claim 1, comprising generating a decision lineage for the point decision based on one or more of decision set metadata, decision metadata, influencer metadata, and outcome metadata.

5. The computer-implemented method of claim 4, wherein the decision lineage traces one or more of influences, processes, and preferences utilized to generate the point decision.

6. The computer-implemented method of claim 1, wherein generation of the point decision includes creating a set of filters based on the sets of preferences and values for the sets of preferences for each influencer to produce a subset of the decisions option set.

7. The computer-implemented method of claim 6, wherein generation of the point decision includes providing the subset of the decisions option set to a machine learning model.

8. The computer-implemented method of claim 7, wherein the machine learning model is trained based on data from similar queries associated with influencers with similar preferences.

9. The computer-implemented method of claim 1, wherein determining the values for the sets of preferences for each influencer comprises mining social media data.

10. The computer-implemented method of claim 1, wherein each influencer has a priority level and a respective priority level is utilized to weight the sets of preferences of a respective influencer relative to other influencers.

11. The computer-implemented method of claim 1, wherein generating the point decision for the query based on the sets of preferences and values for the sets of preferences for each influencer comprises:
   generating a set of conditional gates based on the sets of preferences and values for the sets of preferences for each influencer; and
   applying the set of conditional gates to at least a portion of the decision options set.

12. The computer-implemented method of claim 1, comprising:
   retrieving, via a communication network and using an application program interface, social media data for each of the two or more influencers from a server data store associated with a social media network; and
   determining, by the feedback manager, second sets of preferences for the two or more influencers from the social media data.

13. The computer-implemented method of claim 11, wherein generating the point decision for the query based on the sets of preferences and values for the sets of preferences for each influencer comprises:
   generating a set of filters based on one or more of the set of conditional gates and the sets of preferences and values for the sets of preferences for each influencer; and
   applying the set of filters to at least a portion of the decision options set.

14. An apparatus comprising:
   a processor; and
   memory storing instructions that, when executed by the processor, cause the processor to:
      identify a query;
      deconstruct the query into objective data, constant parameters and conditional parameters;
      generate, based on the constant parameters, a decision options set;
      generate, based on the conditional parameters, at least one conditional gate comprising a logic gate or a quantum gate;
      identify two or more influencers associated with the query, wherein each of the two or more influencers are a person or an entity that set the constant parameters or the conditional parameters of the query;
      determine sets of preferences and values for the sets of preferences for the two or more influencers;
      adjust, by an iteration adjuster and based on the sets of preferences and the values for the sets of preferences for each influencer, the at least one conditional gate; and
      generate, based on the at least one adjusted conditional gate, a point decision for the query, wherein the point decision comprises one decision option from the decision options set.

15. The apparatus of claim 14, wherein the memory further stores instructions that, when executed by the processor, cause the processor to generate an outcomes set corresponding to the point decision, wherein the outcomes set indicates a result of the point decision on at least one preference of at least one influencer.

16. The apparatus of claim 14, wherein generation of the point decision for the query based on the sets of preferences and values for the sets of preferences for each influencer includes:
   generate a set of conditional gates based on the sets of preferences and values for the sets of preferences for each influencer; and
   apply the set of conditional gates to at least a portion of the decision options set.

17. The apparatus of claim 16, wherein generation of the point decision for the query based on the sets of preferences and values for the sets of preferences for each influencer includes:
   generate a set of filters based on one or more of the set of conditional gates and the sets of preferences and values for the preferences for each influencer; and
   apply the set of filters to at least a portion of the decision options set.

18. At least one non-transitory computer-readable storage medium storing computer-executable program code instructions that, when executed by a computing apparatus, cause the computing apparatus to:
   identify a query;
   deconstruct the query into objective data, constant parameters and conditional parameters;
   generate, based on the constant parameters, a decision options set;
   generate, based on the conditional parameters, at least one conditional gate comprising a logic gate or a quantum gate;
   identify two or more influencers associated with the query, wherein each of the two or more influencers are a person or an entity that set the constant parameters or the conditional parameters of the query;
   determine sets of preferences and values for the sets of preferences for the two or more influencers;
   adjust, based on the sets of preferences and the values for the sets of preferences for each influencer, the at least one conditional gate; and
   generate, based on the at least one adjusted conditional gate, a point decision for the query, wherein the point decision comprises one decision option from the decision options set.

19. The at least one non-transitory computer-readable storage medium of claim 18, wherein the computer-executable program code instructions, when executed by the computing apparatus, further cause the computing apparatus to generate an outcomes set corresponding to the point decision, wherein the outcomes set indicates a result of the point decision on at least one preference of at least one influencer.

20. The at least one non-transitory computer-readable storage medium of claim 18, wherein generation of the point decision for the query based on the sets of preferences and values for the sets of preferences for each influencer includes:
  generate a set of conditional gates based on the sets of preferences and values for the sets of preferences for each influencer; and
  apply the set of conditional gates to at least a portion of the decision options set.

* * * * *